United States Patent [19]

Mollet et al.

[11] Patent Number: 5,059,347
[45] Date of Patent: Oct. 22, 1991

[54] AQUEOUS ANTIOXIDENT EMULSIONS

[75] Inventors: Hans Mollet, Reinach; Martin Holer, Magden, both of Switzerland

[73] Assignee: Ciba-Geigy Corporation, Ardsley, N.Y.

[21] Appl. No.: 395,245

[22] Filed: Aug. 17, 1989

[30] Foreign Application Priority Data

Mar. 17, 1989 [CH] Switzerland .................... 998/89

[51] Int. Cl.$^5$ ............................................. C09K 15/14
[52] U.S. Cl. .................... 252/400.62; 252/404; 252/407; 252/308; 252/311; 252/312; 252/356
[58] Field of Search ............... 252/400.62, 404, 407, 252/308, 311, 356, 312

[56] References Cited

U.S. PATENT DOCUMENTS

| | | | |
|---|---|---|---|
| 3,644,482 | 2/1972 | Dexter et al. | 252/404 |
| 3,776,857 | 12/1973 | Lindnen | 252/356 |
| 3,926,840 | 12/1975 | Wendler et al. | 252/356 |
| 3,944,594 | 3/1976 | Kleiner et al. | 252/404 |
| 3,954,658 | 5/1976 | Tsutsumi et al. | 252/356 |
| 3,962,123 | 6/1976 | Di Battista et al. | 252/404 |
| 3,971,733 | 7/1976 | Hawkins | 252/311 |
| 4,097,403 | 6/1978 | Tsutsumi et al. | 252/356 |
| 4,269,743 | 5/1981 | Hulyalkar et al. | 252/407 |
| 4,797,272 | 1/1989 | Linn et al. | 252/311 |

FOREIGN PATENT DOCUMENTS 996502  6/1965  United Kingdom .
1349669 4/1974 United Kingdom .

OTHER PUBLICATIONS

Derwent Abstract 72-05573T/04.

*Primary Examiner*—Deborah L. Kyle
*Assistant Examiner*—Valerie Fee
*Attorney, Agent, or Firm*—Luther A. R. Hall

[57] ABSTRACT

Storage-stable, non-sedimenting emulsions comprising
a) 10 to 80% by weight, based on the emulsion, of one or more antioxidants,
b) 0.25 to 10% by weight, based on the emulsion, of a surfactant in the form of a fatty acid salt of formula R-COOY, wherein R is straight chain or branched $C_3$–$C_{18}$alkyl or straight chain or branched $C_3$–$C_{18}$-alkenyl, or is phenyl($C_3$–$C_{18}$)alkyl, and Y is an alkali metal, which salt is prepared in situ from the fatty acid,
c) 0.25 to 10% by weight, based on the emulsion, of a co-surfactant in the form of an alcohol of the general formula R'—OH, wherein R' is straight chain or branched $C_4$–$C_{19}$alkyl or straight chain or branched $C_4$–$C_{19}$alkenyl, or is phenyl($C_4$–$C_{19}$)alkyl, and
d) water to make up 100%.

The emulsion are used for stabilizing emulsion-polymerized polymers and copolymers such as ABS.

16 Claims, No Drawings

AQUEOUS ANTIOXIDENT EMULSIONS

The present invention relates to storage-stable, non-sedimenting antioxidant emulsions for stabilising emulsion-polymerised polymers and copolymers against oxidative deterioration. The preparation of storage-stable phenolic antioxidant dispersions is taught in U.S. Pat. No. 3,962,123. Besides solid phenolic antioxidants, such dispersions contain fatty acid soaps or nonionic or anionic surfactants and water. Such dispersions are prepared by mixing the different components. The drawback here is that mixing must be effected by high-speed stirring, which means that it is necessary to use elaborate apparatus with a high energy consumption to prepare the dispersions.

Novel storage-stable antioxidant emulsions have now been found which can also be prepared in simple manner and with economic use of available sources of energy.

The emulsions of this invention comprise
a) 10 to 80% by weight, based on the emulsion, of one or more antioxidants,
b) 0.25 to 10% by weight, based on the emulsion, of a surfactant in the form of a fatty acid salt of formula R-COOY, wherein R is straight chain or branched $C_3$–$C_{18}$alkyl or straight chain or branched $C_3$–$C_{18}$-alkenyl, or is phenyl($C_3$–$C_{18}$)alkyl, and Y is an alkali metal, which salt is prepared in situ from the fatty acid,
c) 0.25 to 10% by weight, based on the emulsion, of a co-surfactant in the form of an alcohol of the general formula R'—OH, wherein R' is straight chain or branched $C_4$–$C_{19}$alkyl or straight chain or branched $C_4$–$C_{19}$alkenyl, or is phenyl($C_4$–$C_{19}$)alkyl, and
d) water to make up 100%.

The present invention further relates to a process for the preparation of an aqueous, storage-stable, non-sedimenting antioxidant emulsion as described above, which comprises heating the antioxidant or mixture of antioxidants, which are liquid or liquefied by heating, with an acid of the general formula R-COOH, wherein R is straight chain or branched $C_3$–$C_{18}$alkyl or straight chain or branched $C_3$–$C_{18}$alkenyl or is phenyl($C_3$–$C_{18}$)alkyl, and with an alcohol of the general formula R'—OH, wherein R' is straight chain $C_4$–$C_{19}$alkyl or straight chain or branched $C_4$–$C_{19}$-alkenyl or phenyl($C_4$–$C_{19}$)alkyl, and subsequently adding an aqueous solution of an alkali metal hydroxide, alkali metal hydrogencarbonate or alkali metal carbonate to the melt until the acid is neutralised, and, if desired, adding further water to dilute the emulsion.

The invention also relates to an aqueous, storage-stable, non-sedimenting antioxidant emulsion as described above which is obtainable by the above process.

The eligible antioxidants may be in principle liquid or solid. In this invention it is preferred to use antioxidants which are solid at room temperature.

The antioxidants may preferably be selected from the series of the phenolic antioxidants.

Examples of suitable antioxidants are compounds of the general formula I

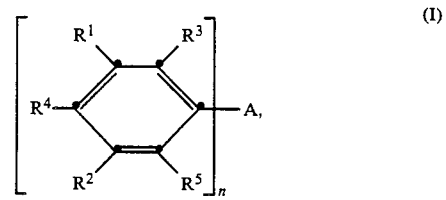

wherein
$R^1$ is $C_1$–$C_{18}$alkyl, $C_5$–$C_{12}$cycloalkyl, $C_1$–$C_4$alkyl-substituted cycloalkyl of 5 to 12 ring carbon atoms, phenyl or $C_7$–$C_9$aralkyl,
$R^2$ is —H, $C_1$–$C_{18}$alkyl, $C_5$–$C_{12}$cycloalkyl, $C_1$–$C_4$alkyl-substituted cycloalkyl of 5 to 12 ring carbon atoms, phenyl or $C_7$–$C_9$aralkyl,
$R^3$ is —H or $CH_3$,
n is 1 or 2, and, when n is 1,
A is

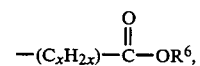

x is 0 to 6,
$R^6$ is —H, $C_1$–$C_{23}$alkyl, $C_5$–$C_{12}$cycloalkyl or $C_1$–$C_4$alkyl-substituted cycloalkyl of 5 to 12 ring carbon atoms, and
$R^4$ is —OH, $R^5$ is —H, or, when n is 2,
A is

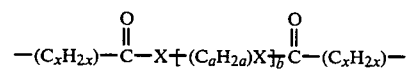

x is 0 to 6,
X is oxygen or sulfur,
a is 2 to 6, and
b is 3 to 40,
$R^4$ is —OH and $R^5$ is —H, or, when n is 2,
A is —S—, —O—, —CH$_2$—S—CH$_2$—,

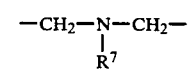

or is an unsubstituted or a $C_1$–$C_{20}$alkyl-substituted $C_1$–$C_{20}$alkylene radical, and
$R^4$ is —OH and $R^5$ is —H or $R^5$ is —OH and $R^4$ is —H or $C_1$–$C_4$alkyl, and
$R^1$ is additionally —H, and
$R^7$ is $C_1$–$C_{18}$alkyl, unsubstituted, hydroxy-substituted or $C_1$–$C_{18}$alkyl-substituted phenyl or phenyl- or hydroxyphenyl-substituted $C_1$–$C_{18}$alkyl.

Useful antioxidants are compounds of the general formula Ia

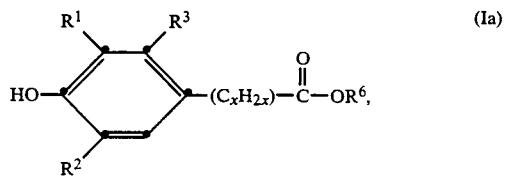

wherein $R^1$, $R^2$, $R^3$ and $R^6$ are as defined above and x is 2 or 3.

Particularly useful compounds of formula Ia are those wherein the group

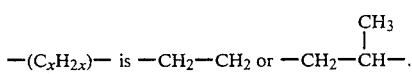

Further preferred compounds of formula Ia are those wherein $R^1$ is methyl or tert-butyl, $R^2$ is tert-butyl and $R^3$ is —H. Also preferred are compounds of formula Ia in which $R^6$ is $C_4$-$C_{18}$alkyl and, most preferably, $C_{12}$-$C_{18}$alkyl. The most preferred meaning of $R^6$ is $C_{12}$alkyl or $C_{18}$alkyl.

The most preferred compound of formula Ia is

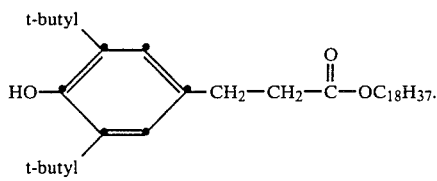

The compounds of formula Ia are known per se from U.S. Pat. No. 3,644,482 and can be prepared in the manner described therein.

Useful compounds are also those of formula Ib

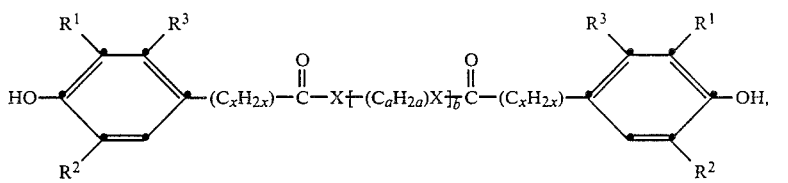

wherein
X, $R^1$, $R^2$ and $R^3$ are as defined above,
x is 2 or 3,
a is 2 to 4, and
b is an integer from 3 to 28.

Preferred compounds of formula Ib are those in which $R^1$ is methyl or tert-butyl, $R^2$ is tert-butyl and $R^3$ is —H. Also preferred are compounds of formula Ib in which the group —$(C_xH_{2x})$— is —$CH_2$—$CH_2$ or

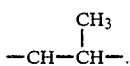

Further preferred compounds of formula Ib are those in which a is 2. A further preference is for compounds of formula Ib in which b is 3.

The most preferred compound of formula Ib is the compound of formula

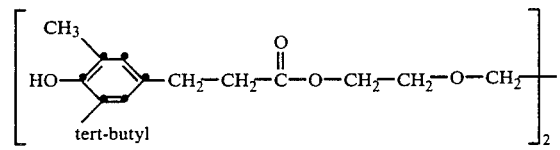

The compounds of formula Ib are known per se from German Offenlegungsschrift 2 133 374 and can be prepared in the manner described therein.

A further group of useful compounds comprises those of formula Ic

wherein $R^1$, $R^2$, $R^3$, $R^4$ and $R^5$ are as previously defined above and A is —S—, —$CH_2$—S—$CH_2$—, —$CH_2$—,

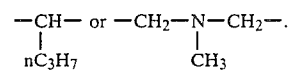

$R^1$ and $R^2$ in compounds of formula Ic are each independently of the other preferably —H or $C_1$-$C_4$alkyl and, most preferably, methyl or tert-butyl.

Particularly preferred compounds of formula Ic are those in which $R^1$ is tert-butyl, $R^2$ is —H, $R^3$ is —H, $R^4$ is —OH and $R^5$ is methyl, or those in which $R^1$ is tert-butyl, $R^2$ is methyl, $R^3$ is —H, $R^4$ is —OH and $R^5$ is —H.

In other particularly preferred compounds of formula Ib, $R^1$ and $R^2$ are tert-butyl, $R^3$ and $R^5$ are —H and $R^4$ is —OH.

In further especially preferred compounds of formula Ic, $R^1$ is methyl, $R^2$ is tert-butyl, $R^3$ and $R^4$ are —H and $R^5$ is —OH.

The most preferred compound of formula Ic is

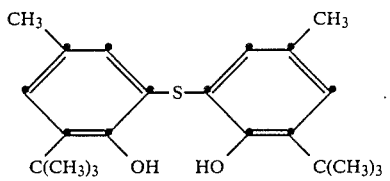

The compounds of formula Ic are disclosed, for example, in GB patent specification 1 349 669.

$R^1$, $R^2$ and $R^7$ as alkyl or, specifically, $C_1$-$C_{18}$alkyl, are typically methyl, ethyl, propyl, isopropyl, n-butyl, isobutyl, 2-butyl, t-butyl, pentyl, isopentyl, hexyl, heptyl, 3-heptyl, octyl, 2-ethylhexyl, nonyl, decyl, undecyl, dodecyl, tridecyl, tetradecyl, pentadecyl, hexadecyl, heptadecyl or octadecyl; 2-ethylbutyl; 1-methylpentyl; 1,3-dimethylbutyl; 1,1,3,3-tetramethylbutyl; 1-methylhexyl; isoheptyl; 1-methylheptyl; 1,1,3-trimethylhexyl or 1-methylundecyl.

$R^6$ may be $C_1$-$C_{23}$alkyl, exemplified by suitable radicals contained in the foregoing recitation and by such additional radicals as eicosyl, heneicosyl and docosyl.

$R^4$ generally and $R^1$ and $R^2$ preferably are $C_1$-$C_4$alkyl, exemplified by methyl, ethyl, propyl, isopropyl, n-butyl, isobutyl, 2-butyl and tert-butyl. Methyl and tert-butyl are especially preferred.

$R^6$ $C_{12}$-$C_{18}$alkyl, in particular lauryl and stearyl.

$R^7$ is preferably $C_1-C_4$alkyl as defined for $R^1$ and $R^2$. Methyl and n-propyl are the most preferred meanings.

$R^1$, $R^2$ or $R^6$ as $C_5-C_{12}$cycloalkyl may be typically cyclopentyl, cyclohexyl, cyclooctyl or cyclododecyl. $C_1-C_4$Alkyl-substituted cycloalkyl groups containing 5 to 12 ring carbon atoms are exemplified by 2- or 4-methylcyclohexyl, dimethylcyclohexyl, trimethylcyclohexyl and tert-butylcyclohexyl.

$R^1$ or $R^2$ as $C_7-C_9$aralkyl may be benzyl and methylbenzyl.

$R^7$ may be $C_1-C_{18}$alkyl-substituted phenyl, for example methylphenyl, dimethylphenyl, trimethylphenyl, ethylphenyl, isopropylphenyl, tert-butylphenyl, di-tert-butylphenyl or 2,6-di-tert-butyl-4-methylphenyl.

A as an unsubstituted or $C_1-C_{20}$alkyl-substituted $C_1-C_{20}$alkylene radical is typically methylene, ethylene, propylene, trimethylene, 2,2-dimethyl-1,3-propanediyl, tetramethylene, pentamethylene, hexamethylene, heptamethylene, octamethylene, decamethylene or dodecamethylene. Methylene is preferred.

The above antioxidants can be used alone or in admixture with one another. The emulsion further contains a surfactant which, in the final emulsion, is a fatty acid salt of formula R-COOY which is prepared in situ.

Starting from a fatty acid of formula R-COOH, the corresponding salt of the fatty acid of formula RCOOY is formed in situ with an alkali metal hydroxide of formula Y-OH, which salt constitutes in turn a surfactant in the emulsion. In place of the alkali metal hydroxide, it is also possible to use an alkali metal carbonate of formula $Y_2CO_3$ or an alkali metal hydrogen carbonate of formula $YHCO_3$.

Fatty acids are exemplified by those in which R is $C_3-C_{18}$alkyl. Such fatty acids are: butyric acid (butanoic acid), isobutyric acid (2-methylpropanoic acid), valeric acid (pentanoic acid), isovaleric acid (3-methylbutanoic acid), pivalic acid (2,2-dimethylpropanoic acid), lauric acid (dodecanoic acid), myristic acid (tetradecanoic acid), palmitic acid (hexadecanoic acid), stearic acid (octadecanoic acid) and eicosanoic acid.

Preferred fatty acids are those of 12 to 18 carbon atoms such as lauric acid, myristic acid, palmitic acid and stearic acid. Lauric acid and stearic acid are especially preferred.

The above-mentioned acids may also be substituted, preferably terminally, with a phenyl group.

R as straight chain or branched $C_3-C_{18}$alkenyl is, for example, the radical of methacrylic acid (2-methylpropenoic acid), crotonic acid (trans-2-butenoic acid), isocrotonic acid (cis-2-butenoic acid), oleic acid (cis-9-octadecenoic acid), elaidic acid (trans-9-octadecenoic acid), sorbic acid (trans,trans-2,4-hexadienoic acid), linoleic acid (cis,cis-9,12-octadecadienoic acid) or linolenic acid (cis,cis,cis-9,12,15-octadecatrienoic acid).

Mixtures of the above acids with one another or the commercially available mixtures of acids known, for example, as tall oil, are also suitable.

In the alkali metal hydroxide of the general formula Y-OH, the alkali metal hydrogencarbonate of the general formula $YHCO_3$ and the alkali metal carbonate of the general formula $Y_2CO_3$, Y may be Li, Na, K, Rb or Cs, preferably Na or K and, most preferably, K. Mixtures of alkali metal hydroxides, alkali metal carbonates and alkali metal hydrogencarbonates may also suitably be used. It is convenient to use alkali metal hydroxides and alkali metal carbonates. Alkali metal hydroxides are preferred.

The surfactant in the form of a fatty acid salt has the general formula R-COOY, wherein R-COO— is preferably an aliphatic acid radical of 12 to 18 carbon atoms and Y is Na or K.

The emulsion of this invention also contains an alcohol or a mixture of alcohols of the general formula R'—OH which acts as a co-surfactant. The symbol R' is, for example, a straight chain or branched $C_4-C_{19}$alkyl group and, preferably, a straight chain $C_4-C_{19}$alkyl group. Examples of alcohols are those in which R' is n-butyl, isobutyl, 2-butyl, pentyl, isopentyl, hexyl, heptyl, 3-heptyl, octyl, 2-ethylhexyl, nonyl, decyl, undecyl, dodecyl, tridecyl, tetradecyl, pentadecyl, hexadecyl, heptadecyl or octadecyl and, additionally, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl or 1-methylundecyl. Preferably R' is a straight chain $C_{12}-C_{18}$alkyl radical and R'—OH is preferably lauryl and stearyl alcohol.

R' as straight chain or branched $C_4-C_{18}$alkenyl is suitalby, for example, 2-methylpropenyl, trans-2-butenyl, cis-9-octadecenyl, trans-9-octadecenyl, trans,trans-2,4-hexadienyl, cis,cis-9,12-octadecadienyl or cis,cis,cis-9,12,15-octadecatrienyl.

Further examples of alcohols of formula R'—OH are:
1-dodecanol; 1-tridecanol; 1-tetradecanol; 1-pentadecanol; 1-hexadecanol;
1-heptadecanol; 1-octadecanol; 2-methyl-1-undecanol; 2-propyl-1-nonanol;
2-butyl-1-octanol; 2-methyl-1-tridecanol; 2-ethyl-1-dodecanol;
2-propyl-1-undecanol; 2-butyl-1-decanol; 2-pentyl-1-nonanol;
2-hexyl-1-octanol; 2-methyl-1-pentadecanol; 2-ethyl-1-tetradecanol;
2-propyl-1-tridecanol; 2-butyl-1-dodecanol; 2-pentyl-1-undecanol;
2-hexyl-1-decanol; 2-heptyl-1-decanol; 2-hexyl-1-nonanol;
2-octyl-1-octanol; 2-methyl-1-heptadecanol; 2-ethyl-1-hexadecanol;
2-propyl-1-pentadecanol; 2-butyl-1-tetradecanol; 1-pentyl-1-tridecanol;
2-hexyl-1-dodecanol; 2-octyl-1-decanol; 2-nonyl-1-nonanol; 2-dodecanol;
3-dodecanol; 4-dodecanol; 5-dodecanol; 6-dodecanol; 2-tetradecanol;
3-tetradecanol; 4-tetradecanol; 5-tetradecanol; 6-tetradecanol;
7-tetradecanol; 2-hexadecanol; 3-hexadecanol; 4-hexadecanol;
5-hexadecanol; 6-hexadecanol; 7-hexadecanol; 8-hexadecanol;
2-octadecanol; 3-octadecanol; 4-octadecanol; 5-octadecanol;
6-octadecanol; 7-octadecanol; 8-octadecanol; 9-octadecanol;
9-octadecanol-1; 2,4,6-trimethyl-1-heptanol;
2,4,6-8-tetramethyl-1-nonanol; 3,5,5-trimethyl-1-hexanol;
3,5,5,7,7-pentamethyl-1-octanol; 3-butyl-1-nonanol; 3-butyl-1-undecanol;
3-hexyl-1-undecanol; 3-hexyl-1-tridecanol; 3-octyl-1-tridecanol;
2-methyl-2-undecanol; 3-methyl-3-undecanol; 4-methyl-4-undecanol;
2-methyl-2-tridecanol; 3-methyl-3-tridecanol; 4-methyl, 3-tridecanol;

4-methyl-4-tridecanol; 3-ethyl-3-decanol; 3-ethyl-3-dodecanol;
2,4,6,8-tetramethyl-2-nonanol; 2-methyl-3-undecanol; 2-methyl-4-undecanol; 4-methyl-2-undecanol; 5-methyl-2-undecanol;
4-ethyl-2-decanol; 4-ethyl-3-decanol; 1-hexyn-3-ol and oleyl alcohol.

In a phenyl($C_4$–$C_{18}$)alkyl group represented by $R^1$, suitable alkyl groups are those defined above which are substituted, preferably terminally, with a phenyl group.

The process for the preparation of the emulsion of this invention described at the outset is conveniently carried out by heating the antioxidant or a mixture of antioxidants selected from those cited above, the acid as surfactant and the alcohol as co-surfactant and, if the products are solid at room temperature, fusing them and mixing them together. If necessary, the melt or mixture is cooled to a temperature below 100° C., and subsequently an aqueous solution of an alkali metal hydroxide, alkali metal hydrogencarbonate or alkali metal carbonate is added, the concentration of the alkali compound being, for example, 0.1 to 15% by weight, normally 1 to 5% by weight and, preferably, 1 to 3% by weight. During the addition of the alkali compound, the temperature must be kept at 60°–100° C., for which reason also the solution of the alkali compound is added warm to the melt or mixture. The individual components are conveniently stirred to achieve complete and homogeneous mixing. Known mixers and agitators, which can conveniently be heated, may be used for this purpose. The amount of alkali compound will depend on the amount of acid and can be computed in simple manner by using approximately one equivalent of alkali compound per one equivalent of acid. Deviations of ca. ±5% from the stoichiometric requirement do not have any effect on the emulsifying action. The temperature which must be kept is normally in the range from 60° to 100° C., preferably from 70° to 90° C. It is expedient to run the aqueous solution of the alkali compound slowly into the melt or mixture, whereupon a water-in-oil emulsion usually forms. To this emulsion is added further water until the desired concentration of antioxidant is reached, whereupon inversion to the desired oil-in-water emulsion takes places. As mentioned above, stirring during the entire emulsifying procedure shall be effected. It is entirely sufficient to stir slowly using a simple agitator and with only weak mechanical force in order to ensure thorough mixing of the phases. This procedure has the advantage that, for example, no foam formation occurs. Suitable alkali compounds are alkali metal hydroxides, alkali metal hydrogencarbonates and alkali metal carbonates. Alkali metal hydroxides are preferred.

After cooling, an oil-in-water emulsion having an average particle size of ca. 1–3 μm diameter is obtained.

The emulsion preferably comprises 20 to 40% by weight of antioxidants, 0.5 to 20% by weight of the surfactant mixture in the form of the alkali metal salt of the acid of formula R-COOH and of the co-surfactant in the form of an alcohol of formula R'—OH. The weight ratio of surfacant to co-surfactant should be at least 1:1, conveniently 1:1 to 1:4, preferably from 1:1 to 1:3 and, most preferably, from 1:1 to 1:2.

The total amount of water in the emulsion can be from 10.5 to just under 90% by weight. Preferably the amount of water is from 35 to 75% by weight. It is a matter of routine skill to calculate the requisite amount of water for the solution of the alkali metal salt and, for the preparation of the solution of the alkali compound, to take it from the total amount of water. The water that is left is then the remainder for bulking the emulsion to 100% by weight and is added last in the process for preparing the emulsion, as described above. Such an emulsion may be further used direct or may be a concentrate which can be further diluted in accordance with its utility.

Especially preferred amulsions of this invention comprise a) 30 to 35% by weight of one or more antioxidants, b) 0.8 to 3.5% by weight of a surfactant in the form of an alkali metal salt of an acid of formula R-COOY, wherein R and Y have the meanings previously assigned to them, c) 0.8 to 7% by weight of a co-surfactant in the form of an alcohol of formula R'—OH, wherein R' has the meaning previously assigned to it, and d) 54.5 to 68.4% by weight of water.

The invention also relates to the use of the emulsions prepared as described above for stabilising emulsion-polymerised polymers and copolymers. The emulsions can be used in processes for the preparation of the following polymers and copolymers, provided said processes are emulsion polymerisation or copolymerisation processes which require a water-emulsifiable antioxidant or in the course of which an antioxidant can be added.

Examples of such polymers are:

1. Polymers of monoolefins and diolefins, for example polypropylene, polyisobutylene, polybut-1-ene, polymethylpent-1-ene, polyisoprene or polybutadiene, as well as polymers of cycloolefins, for example of cyclopentene or norbornene, polyethylene (uncrosslinked or crosslinked), for example high density polyethylene (HDPE), low density polyethylene (LDPE and linear low density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers linear low density polyethylene (LLDPE) and mixtures thereof with low density polyethylene (LDPE), propylene/but-1-ene copolymers, ethylene/hexane copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and their salts (ionomers), as well as terpolymers of ethylene with propylene and a diene such as hexadiene, dicyclopentadiene or ethylidenenorbornene; and also mixtures of such copolymers with each other and with polymers mentioned in 1) above, for example polypropylene/ethylene-propylenecopolymers, LDPE/EVA, LDPE/EAA, LLDPE/EVA and LLDPE/EAA copolymers.

3a. Hydrocarbon resins (for example $C_5$–$C_9$), including hydrogenated modifications thereof (for example tackifiers).

4. Polystyrene, poly-(p-methylstyrene), poly-(α-methylstyrene).

5. Copolymers of styrene or α-methylstyrene with dienes or acrylic derivatives, for example styrene/butadiene, styrene/acrylonitrile, styrene/alkylmethacrylate, styrene/butadiene/alkylacrylate, styrene/maleic anhydride, styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/styrene, styrene/isoprene/styrene, styrene/ethylene/butylene/styrene or styrene/ethylene/propylene/styrene.

6. Graft copolymers of styrene or α-methylstyrene, for example styrene on polybutadiene, styrene on polybutadiene/styrene or polybutadiene/acrylonitrile copolymers; styrene and acrylonitrile (or methacrylonitrile) on polybutadiene; styrene and maleimide on polybutadiene; styrene, acrylonitrile and maleic anhydride or maleimide on polybutadiene; styrene, acrylonitrile and methyl methacrylates on polybutadiene, styrene and alkylacrylates or alkylmethacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for example the copolymer mixtures known as ABS, MBS, ASA or AES polymers.

7. Halogenated polymers such as polychloroprene, chlorinated rubber, chlorinated or sulfochlorinated polyethylene, epichlorohydrin homo- and copolymers, polymers of halogenated vinyl compounds, for example polyvinylchloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from α,β-unsaturated acids and derivatives thereof, such as polyacrylates and polymethacrylates, polyacrylamides and polyacrylonitriles.

9. Copolymers of the monomers mentioned under 8) with each other or with other unsaturated monomers, for example acrylonitrile/butadiene copolymers, acrylonitrile/alkylacrylate copolymers, acrylonitrile/alkoxyalkylacrylate or acrylonitrile/vinyl halide copolymers or acrylonitrile/alkylmethacrylate/butadiene terpolymers.

10. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinylbutyrate, polyallyl phthalate or polyallylmelamine; as well as their copolymers with the olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer; polyacetals modified with thermoplastic polyurethanes, acrylates or MBS.

13. Polyphenylene oxides and sulfides, and mixtures of polyphenylene oxides with polystyrene or polyamides.

14. Polyurethanes which are derived from polyethers, polyesters or polybutadienes with terminal hydroxyl groups on the one hand and aliphatic or aromatic polyisocyanates on the other, as well as precursors thereof.

15. Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylene diamine and isophthalic and/or terephthalic acid and optionally an elastomer as modifier, for example poly-2,4,4-trimethylhexamethylene terephthalamide or poly-m-phenylene isophthalamide, block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS, and polyamides condensed during processing (RIM polyamide systems).

16. Polyureas, polyimides and polyamide-imides and polybenzimidazoles.

17. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate, polyhydroxybenzoates as well as block-copolyether esters derived from hydroxyl-terminated polyethers; and also polyesters modified with polycarbonates or MBS.

18. Polycarbonates and polyester carbonates.

19. Polysulfones, polyether sulfones and polyether ketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Crosslinkable acrylic resins derived from substituted acrylic esters, such as epoxy acrylates, urethane acrylates or polyester acrylates.

24. Alkyd resins, polyester resins or acrylate resins which are crosslinked with melamine resins, urea resins, polyisocyanates or epoxy resins.

25. Crosslinked epoxy resins which are derived from polyepoxides, for example from bisglycidyl ethers or from cycloaliphatic diepoxides.

26. Natural polymers such as cellulose, rubber, gelatin and chemically modified homologous derivatives thereof such as cellulose acetates, cellulose propionates and cellulose butyrates, or the cellulose ethers, such as methylcellulose; rosins and their derivatives.

27. Mixtures (polyblends) of the aforementioned polymers, for example PP/EPDM, polyamide/EPDM or ABS, PVC/EVA, PVC/ABS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 66 and copolymers, PA/HDPE, PA/PP, PA/PPO.

28. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellithates) and also mixtures of synthetic esters with mineral oils in any weight ratios, which materials may be used as plasticizer for polymers or as textile spinning oils, as well as aqueous emulsions of such materials.

29. Aqueous emulsions of natural or synthetic rubber, e.g. natural latex or latices of carboxylated styrene/butadiene copolymers.

The emulsions of this invention are preferably used for stabilising emulsion-polymerised polymers and copolymers such as ABS, MBS, SB and SBR latices.

Normally the amount of emulsifier will be chosen such that the antioxidant is present in the end product, i.e. the polymer or copolymer, in an amount of 0.001 to 10% by weight, conveniently 0.01 to 5% by weight and, preferably, 0.1 to 3% by weight.

The emulsions are added to the emulsion polymerisation reactions in the customary amounts. For example, the ratio may be chosen such that, based on the emulsion polymerisation system, 0.01 to 10% by weight, preferably 0.1 to 5% by weight and, most preferably 0.5 to 2.5% by weight, of antioxidant is present in the system.

The emulsions of this invention can be added to the polymerisation system and, in particular, to the emulsion polymerisation system, prior to the reaction or at the start or at an advanced stage of the polymerisation, but usually before coagulation of the resultant polymers. It is further possible to add the emulsion to a polymer latex and to keep the composition in aqueous dispersed form until the latex is brought into its final form, for example as film, filament or coating.

The following Examples illustrate the invention in more detail. All parts and percentages are by weight, unless otherwise stated.

PREPARATORY EXAMPLES

EXAMPLE 1

100 g of an antioxidant of the chemical structure triethylene glycol bis[3-(3-tert-butyl-4-hydroxy-5-methylphenyl)propionate], 2.5 g of stearic acid and 2.5 g of stearyl alcohol are fused together at ca. 100° C. After cooling to ca. 85° C., 50 ml of water in which 0.49 g of KOH has been dissolved are added to the melt at 80°–85° C. over 15 minutes, while stirring moderately with a half-anchor agitator. With stirring, 150 g of deionised water of ca. 80° C. are then run in at 80°–85° C. over ca. 30 minutes. After cooling to room temperatur, a creamy, readily fluid oil-in-water emulsion is obtained with an average particle size of 1–3 μm. This emulsion is stable at room temperature for several weeks.

EXAMPLE 2

100 g of the antioxidant of the chemical structure octadecyl 3-(3,5-di-tert-butyl-4-hydroxyphenyl)propionate, 5.0 g of stearic acid and 5.0 g of stearyl alcohol are fused together at ca. 100° C. After cooling to ca. 85° C., 50 ml of water in which 1.0 g of KOH has been dissolved are added to this melt, with moderate stirring, at 80°–85° C. over 15 minutes. With stirring, a further 145 ml of deionised water are then added at 80°–85° C. over about 30 minutes. After cooling to room temperature, a creamy, readily fluid oil-in-water emulsion is obtained with an average particle size of ca. 1–3 μm. The pH is 9.3.

EXAMPLE 3

100 g of the antioxidant of the chemical structure 2,2′-thiobis(4-methyl-6-tert-butylphenol), 2.5 g of stearic acid and 2.5 g of stearyl alcohol are fused together at ca. 100° C. After cooling to ca. 85° C., 50 ml of water in which 0.5 g of KOH has been dissolved are added to this melt, with moderate stirring, at 80°–85° C. over about 15 minutes. With gentle stirring, a further 150 g of water of ca. 80° C. are then run in over ca. 30 minutes. After cooling to room temperature, a creamy, readily fluid oil-in-water emulsion is obtained with an average particle size of ca. 1–3 μm. The pH is 9.5.

USE EXAMPLE

EXAMPLE 4

With stirring, 0.7% by weight of an antioxidant emulsion according to Example 1 is added at 50° C. to an ABS latex prepared by emulsion polymerisation and having a solids content of 32%. With efficient stirring, 200 ml of this latex treated with antioxidant are added at 50° C. to 300 ml of water which contains 1.28 g of $H_2SO_4$ (equivalent to 2% by weight of $H_2SO_4$, based on the dry weight of ABS) to coagulate the latex. The mixture is heated to 90° C., kept at this temperature for 2 minutes, and then filtered. The filter residue is washed with deionised water and dried for 6 hours at 60° C. under a vacuum of 150 mm Hg.

The protective action of the antioxidant during the drying of the latex is determined by weighing 5 mg of the dry powder obtained from the latex into an aluminium sampler which is then placed in a differential thermoanalyser. The sample is heated in air to 190° C. in the DTA and the time is measured until onset of the decomposition which is observed in a maximum of the exothermic reaction.

For example 1 (addition of 0.7% of the antioxidant emulsion containing stearyl alcohol), this time is 15.4 min. For the comparison sample 2 (addition of 0.7% of antioxidant emulsion without addition of stearyl alcohol, the time is 12.6 min.

What is claimed is:

1. A storage-stable, non-sedimenting emulsion comprising
   (a) 10 to 80% by weight, based on the emulsion, of one or more antioxidants of formula I

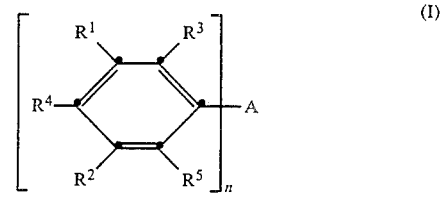

wherein
   $R^1$ is $C_1$–$C_{18}$alkyl, $C_5$–$C_{12}$cycloalkyl, $C_1$–$C_4$alkyl-substituted cycloalkyl of 5 to 12 ring carbon atoms, phenyl or $C_7$–$C_9$aralkyl,
   $R^2$ is —H, $C_1$–$C_{18}$alkyl, $C_5$–$C_{12}$cycloalkyl, $C_1$–$C_4$alkyl-substituted cycloalkyl of 5 to 12 ring carbon atoms, phenyl or $C_7$–$C_9$aralkyl,
   $R^3$ is —H or $CH_3$,
   n is 2, A is —(C$_x$H$_{2x}$)—CO—X—[(C$_a$H$_{2a}$)X-]$_b$—CO—(C$_x$H$_{2x}$)—,
x is 0 to 6,
X is oxygen,
a is 2 to 6,
b is 3 to 40,
R$^4$ is —OH, and
R$^5$ is —H; or
when n is 2 and A is —O—,
R$^4$ is —OH and R$^5$ is —H; or
R$^5$ is —OH and R$^4$ is —H or C$_1$-C$_4$alkyl, and R$^1$ is additionally —H, (b) 0.25 to 10% by weight, based on the emulsion, of a surfactant in the form of a fatty acid salt of formula R-COOY, wherein R is straight or branched chain C$_3$-C$_{18}$alkyl or straight or branched chain C$_3$-C$_{18}$alkenyl, or is phenyl(C$_3$-C$_{18}$alkyl), and Y is an alkali metal, which salt is prepared in situ from the fatty acid, (c) 0.25 to 10% by weight, based on the emulsion, of a co-surfactant in the form of an alcohol of the formula R'—OH, wherein R' is straight or branched chain C$_4$-C$_{19}$alkyl or straight or branched chain C$_4$-C$_{19}$alkenyl, or is phenyl(C$_4$-C$_{19}$)alkyl, and (d) water to make up 100%.

2. An emulsion according to claim 1, wherein the antioxidant is compound of formula Ib

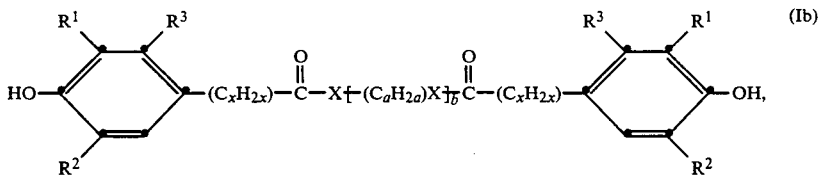

wherein X, R$^1$, R$^2$ and R$^3$ are as defined in claim 1, and x is 2 or 3, a is an integer from 2 to 4 and b is an integer from 3 to 28.

3. An emulsion according to claim 2 which contains a compound of formula Ib, wherein R$^1$ is methyl or tert-butyl, R$^2$ is tert-butyl and R$^3$ is hydrogen.

4. An emulsion according to claim 2 which contains a compound of formula Ib, wherein X is oxygen.

5. An emulsion according to claim 2 which contains a compound of formula Ib, wherein the group —(C$_x$H$_{2x}$)— is —CH$_2$—CH$_2$— or

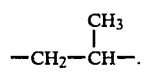

6. An emulsion according to claim 2 which contains a compound of formula Ib, wherein a is 2.

7. An emulsion according to claim 2 which contains a compound of formula Ib, wherein b is 3.

8. An emulsion according to claim 2 which contains a compound of formula

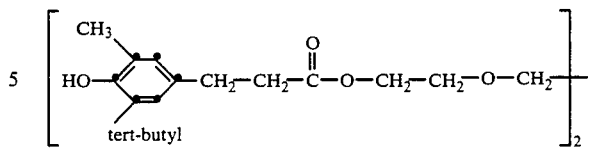

9. An emulsion according to claim 1 which contains a surfactant in the form of a fatty acid salt of the general formula R-COOY, wherein R-COO is an aliphatic acid radical of 12 to 18 carbon atoms and Y is Na or K.

10. An emulsion according to claim 9 which contains a surfactant in the form of a fatty acid salt of formula C$_{11}$H$_{23}$COOK or C$_{17}$H$_{35}$COOK.

11. An emulsion according to claim 1 which contains a co-surfactant in the form of an alcohol of the general formula R'—OH, wherein R' is a straight chain C$_{12}$-C$_{18}$alkyl group.

12. An emulsion according to claim 3 which contains a co-surfactant in the form of an alcohol of formula C$_{12}$H$_{25}$OH or C$_{18}$H$_{37}$OH.

13. An emulsion according to claim 1 which contains b) a surfactant in the form of a fatty acid salt of formula R-COOY which is prepared in situ, and c) a co-surfactant in the form of an alcohol of the general formula R'—OH, the weight ratio of surfactant to co-surfactant being 1:1 to 1:4.

14. An emulsion according to claim 5 which contains b) a surfactant and c) a co-surfactant, the weight ratio of surfactant to co-surfactant being 1:1 to 1:2.

15. A process for the preparation of an aqueous, storage-stable, non-sedimenting antioxidant emulsion as claimed in claim 1, which comprises heating the antioxidant or mixture of antioxidants, which are liquid or liquefied by heating, with an acid of the general formula R-COOH, wherein R is straight chain or branched C$_3$-C$_{18}$alkyl or straight chain or branched C$_3$-C$_{18}$alkenyl or phenyl(C$_3$-C$_{18}$)alkyl, and with an alcohol of the general formula R'—OH, wherein R' is straight chain or branched C$_4$-C$_{19}$alkyl or straight chain or branched C$_4$-C$_{19}$alkenyl or phenyl(C$_4$-C$_{19}$)alkyl, and subsequently adding an aqueous solution of an alkali metal hydroxide, alkali metal hydrogencarbonate or alkali metal carbonate to the melt until the acid is neutralised, and, if desired adding further water to dilute the emulsion.

16. An aqueous, storage-stable, non-sedimenting antioxidant emulsion obtainable by a process according to claim 15.

* * * * *